May 3, 1949. S. M. HARVEY 2,468,873
WELDING ELECTRODE HOLDER SWITCH
Filed Sept. 1, 1948
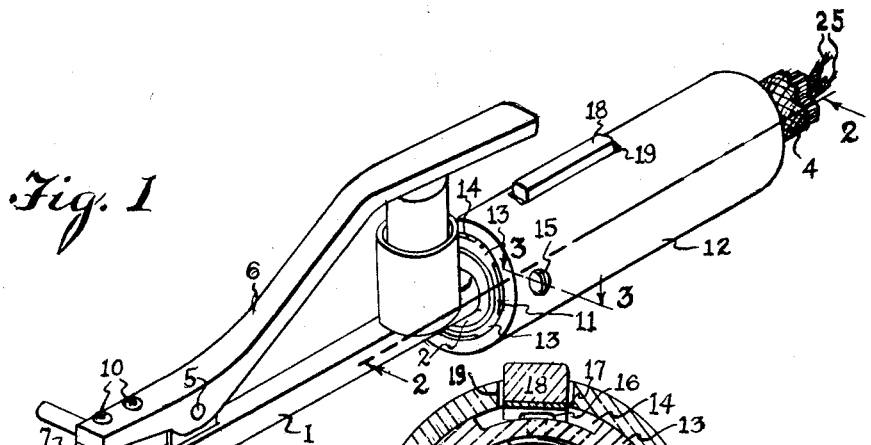
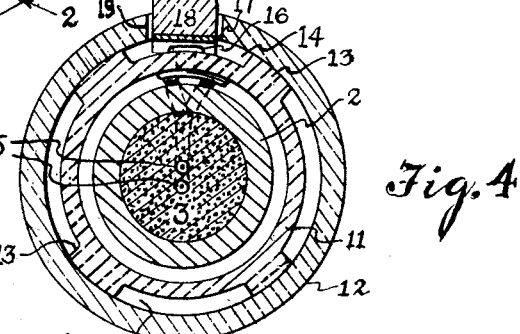
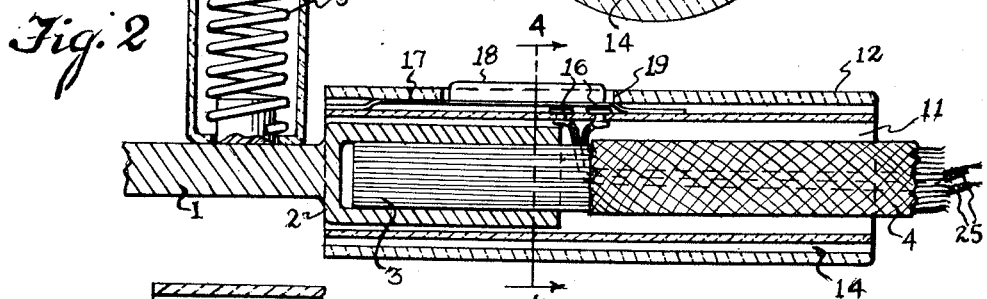
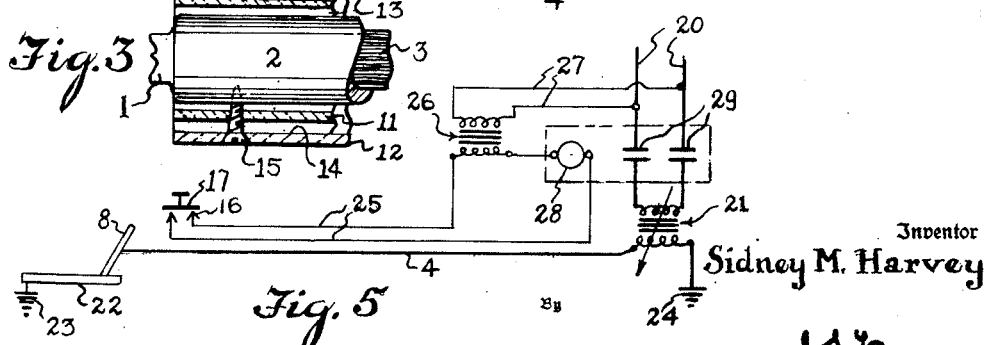
Inventor
Sidney M. Harvey
Attorney Patented May 3, 1949

2,468,873

UNITED STATES PATENT OFFICE 2,468,873

WELDING ELECTRODE HOLDER SWITCH

Sidney M. Harvey, Detroit, Mich.

Application September 1, 1948, Serial No. 47,280

3 Claims. (Cl. 200—157)

1

This invention relates to holders for welding electrodes and may be considered an improvement on the holder disclosed by my Patent 2,094,121, issued September 28, 1937.

Electrode holders for welding are usually connected by a long cord to the secondary of a transformer, with all circuit controls located at such transformer. Due to the consequent inconvenience of cutting off current from the holder, welders often maintain a potential at the holder during intervals when it is not needed, creating a risk of shocks and burns. Thus for example, during replacement of an electrode in a holder, the operator would be considerably safer, if the holder were completely deenergized, but it is common to insert electrodes while a potential prevails.

An object of the invention is to equip an electrode holder with a switch, conveniently disposed on the handle of the appliance, such switch controlling current delivery and allowing an operator to easily deenergize the holder except during periods of actual welding.

Because of the heavy currents required by most welding operations, a switch suited to control the actual welding circuit would necessarily be unduly cumbersome, and it is an object of the invention to control the welding circuit through a relay, which is in turn controlled by a switch on the electrode holder.

Another object is to so install said switch on inner and outer insulating tubes forming the handle that installation of the switch is highly simplified.

These and various other objects are attained by the construction hereinafter described and illustrated in the accompanying drawing, wherein:

Fig. 1 is a perspective view of the improved holder.

Fig. 2 is an enlarged axial sectional view of the rear portion of the holder, taken on the line 2—2 of Fig. 1, and particularly showing the switch installation.

Fig. 3 is a fragmentary section, taken on the line 3—3 of Fig. 1 showing means for securing the handle on the holder.

Fig. 4 is a cross sectional view taken on the line 4—4 of Fig. 2.

Fig. 5 is a diagram of the electrical connections.

In these views the reference character 1 designates an electrically conductive metal bar having an enlarged cylindrical rear portion 2 which forms a socket snugly receiving the bared end 3 of an insulated flexible cable 4 for delivering a welding current to said bar. The end 3 may

2 be secured in and electrically bonded to the socket member by solder or some other suitable provision. Pivoted on the forward portion of the bar 1 at 5 is a lever 6, preferably metallic, rigidly carrying a clamping jaw 7 forwardly of the pivot 5, coacting with a similar jaw 7a fixed on the front end of the bar 1, said jaws serving to grip an electrode 8. The rear portion of the lever 6 is offset from the bar 1 to accommodate therebetween a coiled spring 9 imposing a suitable clamping force on the jaws. The jaws are attached to their supports by screws 10.

The rear or socket portion of the bar 1 is snugly embraced by a handle providing both a thermal and electrical insulation for such bar. Thus said handle comprises inner and outer coaxial tubes 11 and 12 formed of fiber or material of like insulating properties. The tube 11 has a suitable number of circumferentially spaced ribs 13 on its outer face extending from end to end thereof, the grooves 14 between such ribs forming air spaces for thermal insulation. The tube 12 is slip-fitted over said ribs, and both tubes are fixed on the socket member 2 by a screw 15. The foregoing description substantially corresponds to the showing of my Patent 2,094,121 aforementioned.

Describing now my switch installation, the tube 11 carries a pair of contacts 16 occupying one of the grooves 14 and spaced lengthwise thereof. Said groove further receives an elongated metal strip 17 for bridging such contacts, said strip having a spring nature and being sufficiently arched to normally clear the contacts. Outwardly from the contacts, the strip 17 rigidly carries an elongated push-button 18, set into and projecting from an elongated slot 19 in the tube 12. Thus a welder, gripping the described handle, may depress the strip 17 against the contacts 16 by a light thumb pressure on the push button.

Referring now to the electrical connections (Fig. 5), the mains 20 lead from any alternating current source and deliver current through a variable transformer 21 to the aforementioned cable 4 and through such cable to the electrode 8 gripped by the described holder. When the electrode engages a piece of work 22, a current flows since the work is grounded at 23 and the secondary of the transformer 21 is grounded at 24. The switch contacts 16 are in a control circuit 25, including the secondary of a transformer 26 whereof the primary has connections 27 to the mains 20. Said control circuit includes the coil 28 of a relay, which when energized, closes a switch 29 to deliver current from the mains to the transformer 21, such switch being normally open. It follows that there is no potential at the electrode holder except when the push button switch is closed across the contacts 16, except the low and consequently harmless potential of the control circuit.

The described control of the welding current greatly reduces the possibility of an operator being shocked, in using an electrode holder. Heretofore if the operator's body became grounded in any manner, a flow of current through such body was likely to occur, particularly in using the higher welding voltages. Even when the welding voltages were too low to be harmful, there was the possibility of the voltage of the mains being applied to the welding circuit through some improper connection. Use of the described push button switch and control circuit also eliminates need for as much insulation on the parts of an electrode holder as has heretofore been customary.

It is preferred to extend the insulated conductors 25 centrally through the cable 4, so that they will be well protected and out of the way of the operator. It will be noted that no fastening means is required for the push button, same being slipped into its proper position on the tube 12 before the latter receives the tube 11.

What I claim is:

1. In a switch for a welding electrode holder, inner and outer insulating members, a pair of spaced contacts fixed on the inner insulating member, an elongated resilient bridging conductor interposed between said members and having its end portions seating on the inner member and its mid portion normally sprung against the outer member and clear of said contacts, and a push button secured to said mid portion for springing such portion against the contacts, the outer member being apertured to receive and confine said button, whereby said conductor is maintained in operative relation to the contacts.

2. A switch for an electrode holder having inner and outer handle-forming insulating tubes, said switch comprising a pair of contacts spaced upon and lengthwise of the inner tube, an elongated resilient bridging conductor interposed between said tubes and having a portion normally sprung against the outer tube and clear of said contacts, and a push button fixed on said portion for springing such portion against the contacts, the outer tube being apertured to receive and confine said button, whereby said conductor is maintained in operative relation to the contacts.

3. A switch for an electrode holder having an inner insulating tube formed longitudinally and in the outer face thereof with a groove, and having an outer insulating tube fitted over said inner tube and having an aperture opening from said groove, said switch comprising a pair of spaced contacts fixed upon the inner tube within said groove, a conductor within said groove for bridging said contacts and normally sprung against the outer tube to clear said contacts, a pushbutton secured to said conductor and confined within said aperture of the outer tube, and means for interconnecting the inner and outer tubes in a fixed relation.

SIDNEY M. HARVEY.

REFERENCES CITED

The following references are of record in the file of this patent:

UNITED STATES PATENTS

| Number | Name | Date |
| --- | --- | --- |
| 1,438,497 | Jones | Dec. 12, 1922 |
| 1,691,291 | Kahaleohu | Nov. 13, 1928 |
| 1,826,576 | Rump | Oct. 6, 1931 |
| 1,969,543 | Blake | Aug. 7, 1934 |
| 1,977,787 | Wodtke | Oct. 23, 1934 |
| 2,067,153 | King | Jan. 5, 1937 |
| 2,094,121 | Harvey | Sept. 28, 1937 |
| 2,151,552 | Jandos | Mar. 21, 1939 |
| 2,305,206 | Strobel | Dec. 15, 1942 |
| 2,356,521 | Kochner | Aug. 22, 1944 |